United States Patent
Ross et al.

(10) Patent No.: US 10,110,636 B2
(45) Date of Patent: *Oct. 23, 2018

(54) SEGMENTED NETWORKS THAT IMPLEMENT SCANNING

(71) Applicant: vArmour Networks, Inc., Mountain View, CA (US)

(72) Inventors: Colin Ross, Arlington, TX (US); Choung-Yaw Shieh, Palo Alto, CA (US); Jia-Jyi Lian, Saratoga, CA (US); Meng Xu, Los Altos, CA (US); Yi Sun, San Jose, CA (US)

(73) Assignee: vArmour Networks, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/441,156

(22) Filed: Feb. 23, 2017

(65) Prior Publication Data
US 2017/0163688 A1 Jun. 8, 2017

Related U.S. Application Data

(63) Continuation of application No. 15/219,273, filed on Jul. 25, 2016, now Pat. No. 9,609,026, which is a
(Continued)

(51) Int. Cl.
*H04L 29/06* (2006.01)
*H04L 29/08* (2006.01)
*G06F 9/455* (2018.01)

(52) U.S. Cl.
CPC .......... *H04L 63/20* (2013.01); *G06F 9/45558* (2013.01); *H04L 63/0227* (2013.01);
(Continued)

(58) Field of Classification Search
CPC ..... H04L 63/20; H04L 63/02; H04L 63/0254; H04L 63/1433; H04L 29/06578; H04L 29/06986; H04L 63/0227; G06F 21/10
(Continued)

(56) References Cited

U.S. PATENT DOCUMENTS 6,226,372 B1 * 5/2001 Beebe ................. H04L 63/0218
379/145
6,765,864 B1 7/2004 Natarajan et al.
(Continued)

FOREIGN PATENT DOCUMENTS

TW 201702901 A 1/2017
WO WO2016148874 A1 9/2016
(Continued)

OTHER PUBLICATIONS

Non-Final Office Action, dated Jan. 22, 2013, U.S. Appl. No. 13/288,872, filed Nov. 3, 2011.
(Continued)

*Primary Examiner* — Eleni A Shiferaw
*Assistant Examiner* — Shahriar Zarrineh
(74) *Attorney, Agent, or Firm* — Carr & Ferrell LLP

(57) ABSTRACT

Systems for providing scanning within distributed services are provided herein. In some embodiments, a system includes a plurality of segmented environments that each includes an enforcement point that has an active probe device, and a plurality of workloads that each implements at least one service. The system also has a data center server coupled with the plurality of segmented environments over a network. The data center server has a security controller configured to provide a security policy to each of the plurality of segmented environments and an active probe controller configured to cause the active probe device of the plurality of segmented environments to execute a scan.

19 Claims, 8 Drawing Sheets

Related U.S. Application Data continuation-in-part of application No. 14/839,699, filed on Aug. 28, 2015, now Pat. No. 9,438,634.

(52) U.S. Cl.
CPC ...... *H04L 63/0254* (2013.01); *H04L 63/1433* (2013.01); *H04L 67/16* (2013.01); *G06F 2009/45587* (2013.01)

(58) Field of Classification Search
USPC .......................................................... 726/1
See application file for complete search history.

(56) References Cited

U.S. PATENT DOCUMENTS

| | | |
|---|---|---|
| 6,986,061 B1 | 1/2006 | Kunzinger |
| 6,992,985 B1 | 1/2006 | Das |
| 7,058,712 B1 | 6/2006 | Vasko et al. |
| 7,062,566 B2 | 6/2006 | Amara et al. |
| 7,068,598 B1 | 6/2006 | Bryson et al. |
| 7,502,841 B2 | 3/2009 | Small et al. |
| 7,607,170 B2 | 10/2009 | Chesla |
| 7,620,808 B2 | 11/2009 | Le et al. |
| 7,735,141 B1 | 6/2010 | Noel et al. |
| 7,774,837 B2 | 8/2010 | McAlister |
| 7,849,495 B1 | 12/2010 | Huang et al. |
| 7,904,962 B1 | 3/2011 | Jajodia et al. |
| 7,949,677 B2 | 5/2011 | Croft et al. |
| 7,954,150 B2 | 5/2011 | Croft et al. |
| 8,250,213 B2 | 8/2012 | Glover et al. |
| 8,274,912 B2 | 9/2012 | Wray et al. |
| 8,321,862 B2 | 11/2012 | Swamy et al. |
| 8,514,868 B2 | 8/2013 | Hill |
| 8,516,478 B1* | 8/2013 | Edwards ............... G06F 9/505 709/201 |
| 8,612,744 B2* | 12/2013 | Shieh ............... H04L 63/0218 713/153 |
| 8,612,971 B1* | 12/2013 | Fitzgerald ........... G06F 9/45533 718/1 |
| 8,813,169 B2* | 8/2014 | Shieh ............... H04L 63/0209 726/1 |
| 8,918,785 B1* | 12/2014 | Brandwine ......... G06F 9/45558 718/1 |
| 8,959,568 B2 | 2/2015 | Hudis et al. |
| 9,038,151 B1 | 5/2015 | Chua et al. |
| 9,098,578 B2 | 8/2015 | Heim et al. |
| 9,380,027 B1 | 6/2016 | Lian et al. |
| 9,438,634 B1 | 9/2016 | Ross et al. |
| 9,467,476 B1 | 10/2016 | Shieh et al. |
| 9,529,995 B2 | 12/2016 | Shieh |
| 9,560,081 B1 | 1/2017 | Woolward |
| 9,609,026 B2 | 3/2017 | Ross et al. |
| 9,787,639 B1 | 10/2017 | Sun et al. |
| 10,009,383 B2 | 6/2018 | Woolward |
| 2001/0014150 A1 | 8/2001 | Beebe et al. |
| 2002/0093527 A1 | 7/2002 | Sherlock et al. |
| 2002/0124067 A1 | 9/2002 | Parupudi et al. |
| 2003/0172145 A1 | 9/2003 | Nguyen |
| 2003/0177389 A1 | 9/2003 | Albert et al. |
| 2003/0204632 A1 | 10/2003 | Willebeek-LeMair et al. |
| 2003/0204728 A1 | 10/2003 | Irwin |
| 2004/0093513 A1 | 5/2004 | Cantrell et al. |
| 2004/0095897 A1 | 5/2004 | Vafaei |
| 2004/0193943 A1* | 9/2004 | Angelino ............ H04L 63/1408 714/4.1 |
| 2004/0250124 A1 | 12/2004 | Chesla et al. |
| 2005/0005169 A1* | 1/2005 | Kelekar ............. H04L 63/1408 726/4 |
| 2005/0008001 A1* | 1/2005 | Williams ........... H04L 41/0853 370/352 |
| 2005/0010821 A1 | 1/2005 | Cooper et al. |
| 2005/0081058 A1 | 4/2005 | Chang et al. |
| 2005/0160286 A1* | 7/2005 | Currie ................... G06F 21/577 726/22 |
| 2005/0188217 A1 | 8/2005 | Ghanea-Hercock |
| 2005/0193222 A1 | 9/2005 | Greene |
| 2005/0229255 A1 | 10/2005 | Gula et al. |
| 2006/0177063 A1 | 8/2006 | Conway et al. |
| 2007/0079308 A1 | 4/2007 | Chiaramonte et al. |
| 2007/0171921 A1* | 7/2007 | Wookey ................ G06F 3/1415 370/401 |
| 2007/0192863 A1 | 8/2007 | Kapoor et al. |
| 2007/0271612 A1 | 11/2007 | Fang et al. |
| 2007/0283441 A1* | 12/2007 | Cole .................... G02B 5/3083 726/25 |
| 2008/0052774 A1 | 2/2008 | Chesla et al. |
| 2008/0077690 A1 | 3/2008 | Miyajima |
| 2008/0083011 A1 | 4/2008 | McAlister et al. |
| 2008/0155239 A1 | 6/2008 | Chowdhury et al. |
| 2008/0262990 A1 | 10/2008 | Kapoor et al. |
| 2008/0276295 A1 | 11/2008 | Nair |
| 2008/0276297 A1 | 11/2008 | Shay |
| 2008/0301770 A1 | 12/2008 | Kinder |
| 2009/0003278 A1 | 1/2009 | Abdel-Kader et al. |
| 2009/0249472 A1 | 10/2009 | Litvin et al. |
| 2010/0043068 A1 | 2/2010 | Varadhan et al. |
| 2010/0095367 A1 | 4/2010 | Narayanaswamy |
| 2010/0100616 A1 | 4/2010 | Bryson et al. |
| 2010/0100962 A1* | 4/2010 | Boren ................ H04L 63/1433 726/25 |
| 2010/0175134 A1* | 7/2010 | Ali-Ahmad ......... H04L 63/1408 726/24 |
| 2010/0228962 A1 | 9/2010 | Simon et al. |
| 2010/0235880 A1 | 9/2010 | Chen et al. |
| 2010/0251329 A1* | 9/2010 | Wei .................... H04L 63/1408 726/1 |
| 2010/0281533 A1 | 11/2010 | Mao et al. |
| 2011/0003580 A1 | 1/2011 | Belrose et al. |
| 2011/0030037 A1 | 2/2011 | Olshansky et al. |
| 2011/0033271 A1 | 2/2011 | Hanel |
| 2011/0069710 A1 | 3/2011 | Naven et al. |
| 2011/0138384 A1 | 6/2011 | Bozek et al. |
| 2011/0185431 A1 | 7/2011 | Deraison |
| 2011/0214157 A1 | 9/2011 | Korsunsky et al. |
| 2011/0225624 A1 | 9/2011 | Sawhney et al. |
| 2011/0261722 A1 | 10/2011 | Awano |
| 2011/0263238 A1 | 10/2011 | Riley et al. |
| 2011/0277034 A1* | 11/2011 | Hanson ............... H04L 63/1433 726/25 |
| 2011/0299533 A1 | 12/2011 | Yu et al. |
| 2011/0314520 A1 | 12/2011 | Olszewski et al. |
| 2012/0017258 A1 | 1/2012 | Suzuki |
| 2012/0131685 A1 | 5/2012 | Broch et al. |
| 2012/0167161 A1 | 6/2012 | Kim |
| 2012/0203877 A1 | 8/2012 | Bartholomay et al. |
| 2012/0210417 A1 | 8/2012 | Shieh |
| 2012/0240185 A1 | 9/2012 | Kapoor et al. |
| 2012/0254980 A1 | 10/2012 | Takahashi |
| 2012/0287931 A1 | 11/2012 | Kidambi et al. |
| 2012/0297073 A1 | 11/2012 | Glover et al. |
| 2012/0311144 A1 | 12/2012 | Akelbein et al. |
| 2012/0311575 A1 | 12/2012 | Song |
| 2013/0007234 A1 | 1/2013 | Bartfai-Walcott et al. |
| 2013/0019277 A1 | 1/2013 | Chang et al. |
| 2013/0055246 A1 | 2/2013 | Li et al. |
| 2013/0055398 A1 | 2/2013 | Li et al. |
| 2013/0091264 A1* | 4/2013 | Shieh .................... H04L 63/20 709/223 |
| 2013/0091577 A1 | 4/2013 | McGinley et al. |
| 2013/0097692 A1 | 4/2013 | Cooper et al. |
| 2013/0108050 A1 | 5/2013 | Wu et al. |
| 2013/0117836 A1 | 5/2013 | Shieh |
| 2013/0125112 A1 | 5/2013 | Mittal et al. |
| 2013/0174246 A1 | 7/2013 | Schrecker et al. |
| 2013/0254871 A1 | 9/2013 | Sun et al. |
| 2013/0275592 A1 | 10/2013 | Xu et al. |
| 2013/0283336 A1 | 10/2013 | Macy et al. |
| 2013/0283370 A1 | 10/2013 | Vipat et al. |
| 2013/0298184 A1 | 11/2013 | Ermagan et al. |
| 2013/0305357 A1 | 11/2013 | Ayyagari et al. |
| 2013/0340039 A1 | 12/2013 | Malaney |

(56) References Cited

U.S. PATENT DOCUMENTS

| | | | |
|---|---|---|---|
| 2014/0013434 A1* | 1/2014 | Ranum | H04L 63/145 726/24 |
| 2014/0033271 A1 | 1/2014 | Barton et al. | |
| 2014/0115654 A1 | 4/2014 | Rogers et al. | |
| 2014/0137184 A1 | 5/2014 | Russello et al. | |
| 2014/0149569 A1 | 5/2014 | Wittenstein et al. | |
| 2014/0230008 A1 | 8/2014 | Feroz et al. | |
| 2015/0089623 A1* | 3/2015 | Sondhi | H04L 63/08 726/9 |
| 2015/0150072 A1 | 5/2015 | Doctor et al. | |
| 2015/0264011 A1* | 9/2015 | Liang | H04L 63/0209 726/11 |
| 2015/0281274 A1 | 10/2015 | Masurekar et al. | |
| 2015/0281347 A1 | 10/2015 | Wang et al. | |
| 2015/0304354 A1 | 10/2015 | Rogers et al. | |
| 2015/0326589 A1 | 11/2015 | Smith | |
| 2016/0099962 A1* | 4/2016 | Peach | H04L 63/1433 726/25 |
| 2016/0269425 A1 | 9/2016 | Shieh et al. | |
| 2017/0063791 A1 | 3/2017 | Ross et al. | |
| 2017/0063933 A1 | 3/2017 | Shieh et al. | |
| 2017/0374102 A1 | 12/2017 | Woolward | |

FOREIGN PATENT DOCUMENTS

| | | |
|---|---|---|
| WO | WO2017040148 A1 | 3/2017 |
| WO | WO2017040205 A1 | 3/2017 |

OTHER PUBLICATIONS

Non-Final Office Action, dated Feb. 13, 2013, U.S. Appl. No. 13/363,088, filed Jan. 31, 2012.
Non-Final Office Action, dated May 8, 2013, U.S. Appl. No. 13/291,739, filed Nov. 8, 2011.
Final Office Action, dated Jun. 24, 2013, U.S. Appl. No. 13/288,872, filed Nov. 3, 2011.
Notice of Allowance, dated Aug. 16, 2013, U.S. Appl. No. 13/363,088, filed Jan. 31, 2012.
Final Office Action, dated Oct. 16, 2013, U.S. Appl. No. 13/291,739, filed Nov. 8, 2011.
Non-Final Office Action, dated Oct. 28, 2013, U.S. Appl. No. 13/288,872, filed Nov. 3, 2011.
Notice of Allowance, dated Apr. 11, 2014, U.S. Appl. No. 13/288,872, filed Nov. 3, 2011.
Non-Final Office Action, dated Jun. 23, 2014, U.S. Appl. No. 13/849,315, filed Mar. 22, 2013.
Non-Final Office Action, dated Oct. 21, 2014, U.S. Appl. No. 13/291,739, filed Nov. 8, 2011.
Final Office Action, dated Dec. 30, 2014, U.S. Appl. No. 13/849,315, filed Mar. 22, 2013.
Final Office Action, dated May 19, 2015, U.S. Appl. No. 13/291,739, filed Nov. 8, 2011.
Non-Final Office Action, dated Jun. 4, 2015, U.S. Appl. No. 13/849,315, filed Mar. 22, 2013.
Non-Final Office Action, dated Oct. 27, 2015, U.S. Appl. No. 13/291,739, filed Nov. 8, 2011.
Non-Final Office Action, dated Nov. 25, 2015, U.S. Appl. No. 14/839,699, filed Aug. 28, 2015.
Final Office Action, dated Dec. 2, 2015, U.S. Appl. No. 13/849,315, filed Mar. 22, 2013.
Non-Final Office Action, dated Feb. 19, 2016, U.S. Appl. No. 14/839,649, filed Aug. 28, 2015.
Notice of Allowance, dated Apr. 18, 2016, U.S. Appl. No. 13/849,315, filed Mar. 22, 2013.
Notice of Allowance, dated Apr. 27, 2016, U.S. Appl. No. 14/839,699, filed Aug. 28, 2015.
Notice of Allowance, dated May 20, 2016, U.S. Appl. No. 13/291,739, filed Nov. 8, 2011.
Notice of Allowance, dated Jun. 6, 2016, U.S. Appl. No. 14/839,649, filed Aug. 28, 2015.
Non-Final Office Action, dated Aug. 30, 2016, U.S. Appl. No. 14/657,282, filed Mar. 13, 2015.
Notice of Allowance, dated Sep. 15, 2016, U.S. Appl. No. 15/192,967, filed Jun. 24, 2016.
Notice of Allowance, dated Nov. 4, 2016, U.S. Appl. No. 15/219,273, filed Jul. 25, 2016.
Final Office Action, dated Jan. 26, 2017, U.S. Appl. No. 14/657,282, filed Mar. 13, 2015.
Non-Final Office Action, dated Mar. 17, 2017, U.S. Appl. No. 15/387,584, filed Dec. 21, 2016.
"International Search Report" and "Written Opinion of the International Searching Authority", Patent Cooperation Treaty Application No. PCT/US2016/019882, dated May 5, 2016, 12 pages.
"International Search Report" and "Written Opinion of the International Searching Authority", Patent Cooperation Treaty Application No. PCT/US2016/048412, dated Nov. 4, 2016, 10 pages.
"International Search Report" and "Written Opinion of the International Searching Authority", Patent Cooperation Treaty Application No. PCT/US2016/048711, dated Nov. 4, 2016, 10 pages.

* cited by examiner

```
                                    800

┌─────────────────────────────────────────────┐
│ Establishing a plurality of microsegmented  │
│ environments within a cloud data center.    │
│ Each of the plurality of microsegmented     │
│ environments comprises a hypervisor that    │
│ controls a plurality of virtual machines.   │
│ Each of the hypervisors comprises at least  │
│ one active probe device that implements     │
│ vulnerability scanning.                     │
│                    802                      │
└─────────────────────────────────────────────┘
                       │
                       ▼
┌─────────────────────────────────────────────┐
│  Provisioning each of the plurality of      │
│  microsegmented environments with a         │
│  security policy that is implemented by     │
│  the hypervisor                             │
│                  804                        │
└─────────────────────────────────────────────┘
                       │
                       ▼
┌─────────────────────────────────────────────┐
│  Executing a vulnerability scan on each of  │
│  the plurality of microsegmented            │
│  environments by way of their respective    │
│  active probe devices                       │
│                  806                        │
└─────────────────────────────────────────────┘
```

*FIG. 8*

SEGMENTED NETWORKS THAT IMPLEMENT SCANNING

CROSS-REFERENCE TO RELATED APPLICATIONS

This application is continuation of U.S. patent application Ser. No. 15/219,273, filed Jul. 25, 2016, now U.S. Pat. No. 9,609,026, issued Mar. 28, 2017, which in turn is a continuation-in-part of U.S. patent application Ser. No. 14/839,699, filed Aug. 28, 2015, now U.S. Pat. No. 9,438,634, issued Sep. 6, 2016, which in turn is related to U.S. patent application Ser. No. 14/657,282, filed Mar. 13, 2015, U.S. patent application Ser. No. 14/673,679, filed Mar. 30, 2015, now U.S. Pat. No. 9,294,442, issued Mar. 22, 2016, and U.S. patent application Ser. No. 14/839,649, filed Aug. 28, 2015, now U.S. Pat. No. 9,467,476, issued Oct. 11, 2016, which are all hereby incorporated by reference herein in their entirety, including all references and appendices cited therein.

FIELD OF THE PRESENT TECHNOLOGY

The present technology is directed to cloud computing security, and more specifically, but not by limitation, to systems and methods that provide scanning within segmented networks.

SUMMARY

According to some embodiments, the present technology is directed to a system including: (a) a memory; (b) one or more processors; (c) a plurality of segmented environments, each of the plurality of segmented environments comprising an enforcement point comprising an active probe device, and a plurality of workloads each implementing at least one service component, the plurality of segmented environments collectively providing a service, each of the plurality of segmented environments providing a portion of the service; and (d) a data center server coupled with the plurality of segmented environments over a network, the data center server comprising: (i) a security controller providing a security policy to each of the plurality of segmented environments, the security policy being configured using the service; and (ii) an active probe controller requesting each active probe device of the plurality of segmented environments to perform a respective scan of a plurality of scans, the scans including packet insertion and/or modification, the scans performed on the plurality of segmented environments collectively providing the service, the scans occurring in parallel on the plurality of workloads implementing the at least one service component, the active probe device identifying an affected segmented environment.

According to some embodiments, the present technology is directed to a method including: (a) establishing a plurality of segmented environments within a data center, each of the plurality of segmented environments comprising an enforcement point comprising an active probe device, and a plurality of workloads each implementing at least one service component, the plurality of segmented environments collectively providing a service, each of the plurality of segmented environments providing a portion of the service; (b) provisioning each of the plurality of segmented environments with a security policy, the security policy being configured using the service; and (c) performing a scan on each of the plurality of segmented environments using a respective active probe device, the scans including packet insertion and/or modification, the scans performed on the plurality of segmented environments collectively providing the service, the scans occurring in parallel on the plurality of workloads implementing the at least one service component, the active probe device identifying an affected segmented environment.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 8 is a flowchart of an example method executed in accordance with the present technology.

DETAILED DESCRIPTION

Figure 1:
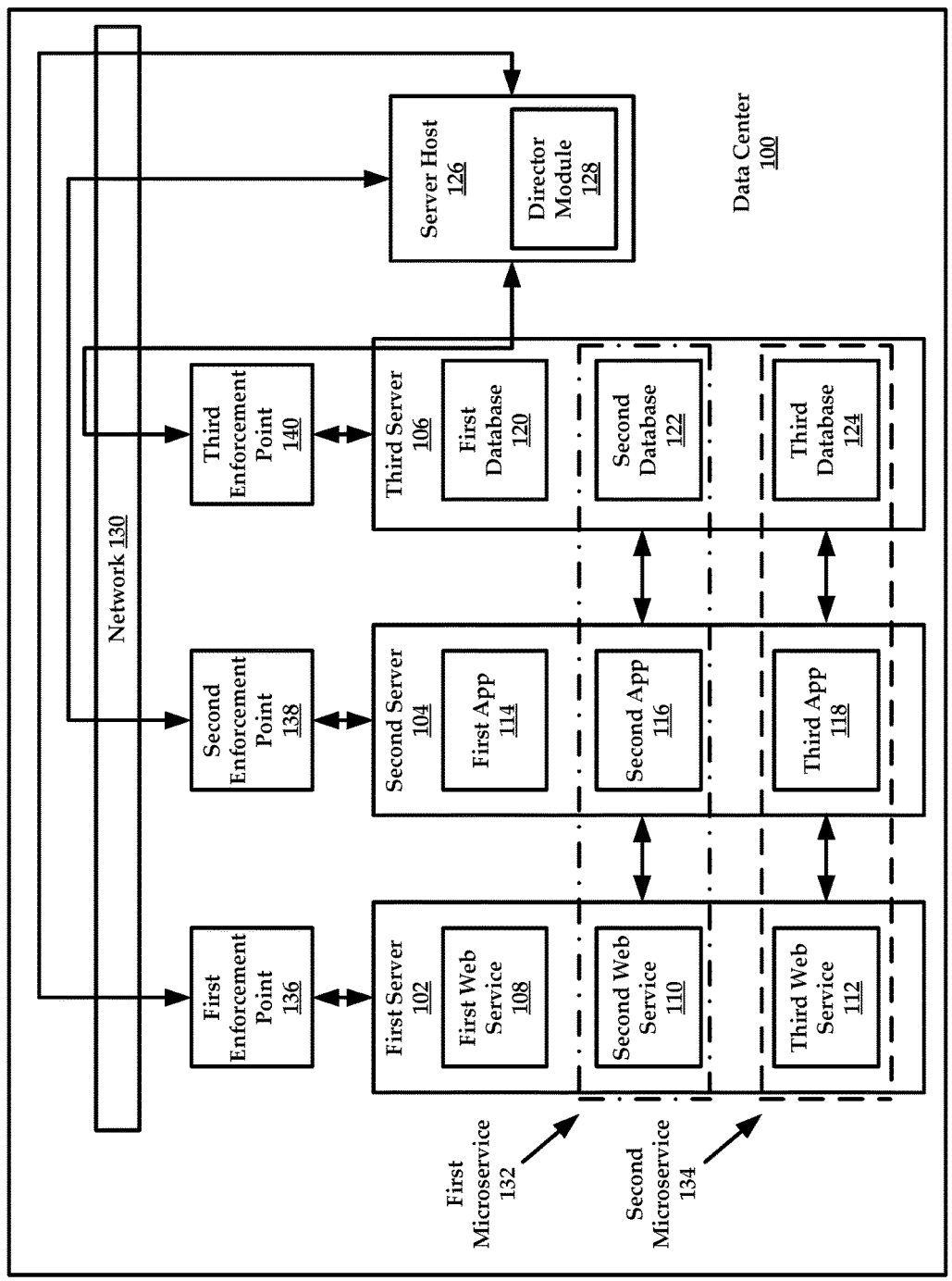
FIG. 1 is a schematic diagram of a datacenter providing secure services that are secured using the present technology.

The present technology is directed to providing security within distributed services. The present technology creates secure virtual boundaries around services.

In one embodiment, the present technology involves a datacenter, which can be implemented within a cloud. The datacenter includes physical resources such as servers that provide workloads. The workloads can be virtual machines, containers, or physical servers. The workloads can provide service components such as web services, application services, database services, and so forth. In some embodiments, the servers are physically separate from one another within the datacenter.

A service is a combination of service components selected to facilitate the service. An example service includes, but is not limited to, a game, an e-commerce application, a media service, and so forth. Because the servers providing the service components can be distributed in different physical locations, the service is itself distributed because its service components may not reside on the same physical server. To be sure, the present technology can manage enforcement points on multiple servers as a single, logical system.

Enforcement points are described in related U.S. patent application Ser. No. 14/673,679, entitled "System and Method for Threat-Driven Security Policy Controls," filed on Mar. 30, 2015, which is hereby incorporated by reference in its entirety.

In the present technology, the servers and workloads are controlled with a host server that coordinates the operations of the distributed service components to provide the service. The host server includes a director module that manages sessions and settings of the distributed service components.

The director module can also instantiate (e.g., "spin up") a plurality of enforcement points that are configured to create a secure virtual boundary around a set of distributed service components for a service.

The enforcement points can intercept and measure traffic at locations within the secure virtual boundary, such as traffic entering and exiting the distributed service components.

In some embodiments, the director module distributes a security policy, such as a firewall policy to the enforcement points which protect each of the distributed service components. The director module can also receive traffic information from the enforcement points and determine network traffic profiles and malicious attacks that are occurring on, or within the secure virtual boundary.

Advantageously, the present technology provides a distributed service system where distributed enforcement points are placed in communication with enterprise assets such as service components. The enforcement points are configured to correlate information to understand the traffic flows within the secure virtual boundary.

The enforcement points provide a stateful solution by operating as security policy enforcement devices that use stateful inspection engines for analyzing network traffic.

In another advantage, the present technology provides for real-time detection and visualization of threat movement, attack remediation, and exfiltration prevention, as well as microsegmentation and policy enforcement control.

As mentioned above, the present technology provides a data center security solution that protects enterprise data, whether on-cloud or on-premise, with a single virtual security system.

The data center security of the present technology delivers a consistent layer of visibility and control across virtual, cloud and physical applications. Using the present technology, enterprises can understand the progression of an attack and trace its lineage to a "Patient Zero," a point of entry of an attacker (or the first infected computer). Using the present technology, enterprises have immediate insight into their data center risk profile and are able to adjust security measures without changing existing policies or Information Technology (IT) infrastructures.

Referring now to FIG. 1, a schematic diagram of a data center 100 providing secure services that are secured using the present technology is illustrated. In some embodiments, the data center 100 is generally described as a cloud-based computing environment that facilitates services, such as enterprise services. It will be understood that the data center 100 can be utilized to provide any type of service, such as gaming services, email services, e-commerce services, Domain Name System (DNS) services, web hosting services, and so forth.

In general, a cloud-based computing environment is a resource that typically combines the computational power of a large grouping of processors, and/or an environment that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, such as web servers, with each web server (or at least a plurality thereof) providing processor and/or storage resources. These servers may manage workloads servicing multiple users (e.g., cloud resource customers or other users). Typically, each user places workload demands upon the cloud that vary in real-time, sometimes dramatically. The nature and extent of these variations typically depend on the type of business associated with the user.

The data center 100 is configured to provide services to tenants. A service will be understood to include a software application (e.g., service) that is comprised of a plurality of independently deployable services, referred to herein as "service components." In some embodiments, the data center 100 comprises a plurality of physical servers (sometimes referred to as racks or blades), such as a first server 102, a second server 104, and a third server 106.

In one embodiment, the first server 102 provides web service services that provide a standardized means for integrating web applications using various open standards such as JavaScript Object Notation (JSON), Representational State Transfer (REST), and so forth. As illustrated, the first server 102 comprises a plurality of service components such as a first web service 108, a second web service 110, and a third web service 112. Again, the first server 102 can comprise additional or fewer service components than those illustrated. Also, the type of web service provided by each of the web service service components can be identical or different. For example, the web service service components 108-112 can all provide Simple Object Access Protocol (SOAP) services, while in another embodiment each of the web service service components 108-112 can provide a unique web service.

The second server 104 comprises a plurality of application service components such as the first application (App) 114, the second application 116, and the third application 118. Again, the second server 104 can comprise additional or fewer service components than those illustrated. Also, the type of application provided by each of the application service components can be identical or different. The applications provided by the application service components 114-118 can be identical or different from one another.

The third server 106 comprises a plurality of database service components such as the first database 120, the second database 122, and the third database 124. Again, the third server 106 can comprise additional or fewer service components than those illustrated. Also, the type of database provided by each of the database service components can be identical or different. The database provided by the database service components 120-124 can be identical or different from one another.

The data center 100 also comprises a server host 126 that can be located away from the servers 102-106 so as to reduce the likelihood that the host server will be infected with malware or subject to a malicious attack if any of the servers 102-106 or their service components are attacked. The server host 126 can also include a virtual machine server or a physical server. The server host 126 can comprise a director module 128. The director module 128 can comprise executable instructions that are stored in a non-transitory computer readable medium, such as memory of the server host 126. The director module 128 can be executed by a processor of the server host 126 to provide functionalities ascribed to the director module 128 which are described in greater detail below.

As used herein, the term "module," "controller," or "device" may also refer to any of an application-specific integrated circuit (ASIC), an electronic circuit, a processor (shared, dedicated, or group) that executes one or more software or firmware programs, a combinational logic circuit, and/or other suitable components that provide the described functionality.

The servers 102-106 each provide a service type. For example, the service type for the first server 102 comprises web services, while a service type of the second server 104 is applications, and the service type of the third server 106 is database related.

In some embodiments, the data center 100 can comprise additional or fewer servers than those illustrated. Also, the services of some of the servers, for example servers 102 and 104, can be combined onto a single physical server but facilitated by a virtual machine. Thus, the web service service components 108-112 can be executed using a first virtual machine, while the application service components 114-118 can be executed on a second virtual machine. Indeed, the first and second virtual machines can be managed on the same physical server, such as the first or second servers 102 and 104, respectively.

In some embodiments the data center 100 comprises a network 130 that communicatively couples the servers 102-106 and server host 126. Suitable networks may include or interface with any one or more of, for instance, a local intranet, a Personal Area Network (PAN), a Local Area Network (LAN), a Wide Area Network (WAN), a Metropolitan Area Network (MAN), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, Digital Subscriber Line (DSL) connection, an Ethernet connection, an Integrated Services Digital Network (ISDN) line, a dial-up port such as a V.90, V.34 or V.34bis analog modem connection, a cable modem, an Asynchronous Transfer Mode (ATM) connection, or a Fiber Distributed Data Interface (FDDI) or Copper Distributed Data Interface (CDDI) connection. Furthermore, communications may also include links to any of a variety of wireless networks, including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), Cellular Digital Packet Data (CDPD), Research in Motion, Limited (RIM) duplex paging network, Bluetooth radio, or an IEEE 802.11-based radio frequency network.

The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In some embodiments, individual service components from an individual server can be used to facilitate a service. For example, a first service 132 comprises a game service. The first service 132 comprises the second web service 110, the second application 116, and the second database 122. To be sure, these selected service components are needed to facilitate the game service.

In various exemplary embodiments, a second service 134 comprises an e-commerce service. The second service 134 comprises the third web service 112, the third application 118, and the third database 124. To be sure, these selected service components are needed to facilitate the e-commerce service.

In sum, the data center 100 is configured to provide a plurality of services where each service is comprised of a plurality of service components.

Cooperative communication between service components allows the data center 100 to provide the service to a tenant or end user. For example, the second web service 110, the second application 116, and the second database 122 are all communicatively coupled with one another using the network 130.

As mentioned above, the servers that host these service components can be positioned remotely from one another. Thus, the service components need not be collocated in the same physical server. This physical separation of servers results in physical separation of service components for a service.

The present technology can provide security policies such as firewall policies that protect these distributed services. Rather than directing network traffic to a static firewall or other static appliance, the data center 100 can employ the use of enforcement points, such as enforcement points 136-140 that are disposed within the network communications path of the service components of a service.

In general, an enforcement point is a virtual or physical module that operates as a security policy enforcement device that uses stateful inspection engines for analyzing network traffic within a secure virtual (e.g., logical) boundary.

An enforcement point can be "spun up" or initiated when a service is requested by a tenant or user of the data center 100. For example, if an end user desires to use the first service 132 (e.g., a game service), the user will request use of the first service 132 through the server host 126. The server host 126 will determine which service components are needed (in this case the second web service 110, the second application 116, and the second database 122) and will deploy a plurality of enforcement points for the service components.

In one embodiment, the data center 100 includes a first enforcement point 136, a second enforcement point 138, and a third enforcement point 140. The first enforcement point 136 is deployed for the first server 102 and the second web service 110. The second enforcement point 138 is deployed for the second server 104 and the second application 116, while the third enforcement point 140 is deployed for the third server 106 and the second database 122. Again, the deployment of the enforcement points is controlled by the director module 128 of the server host 126.

Each of the enforcement points can be placed in network communication with their respective service component to intercept and analyze network traffic. In some embodiments, each of the enforcement points analyzes service component network traffic by decoding higher-level protocols that create the data stream in software, at "line rate," with an acceptable computational cost.

The enforcement points can be deployed near an asset (such as a server or service component) to examine precisely the internal and external traffic into that asset (which may be indicative of malicious attacks) or from that asset (indications of infection and internal attacks), and can also be used to provide very granular control (e.g., pass only specific traffic). In some embodiments, the enforcement points comprise logical entities and operate in a global context, the enforcement points can migrate when an asset, such as a service component, migrates (e.g., in a virtual environment).

Figure 2:
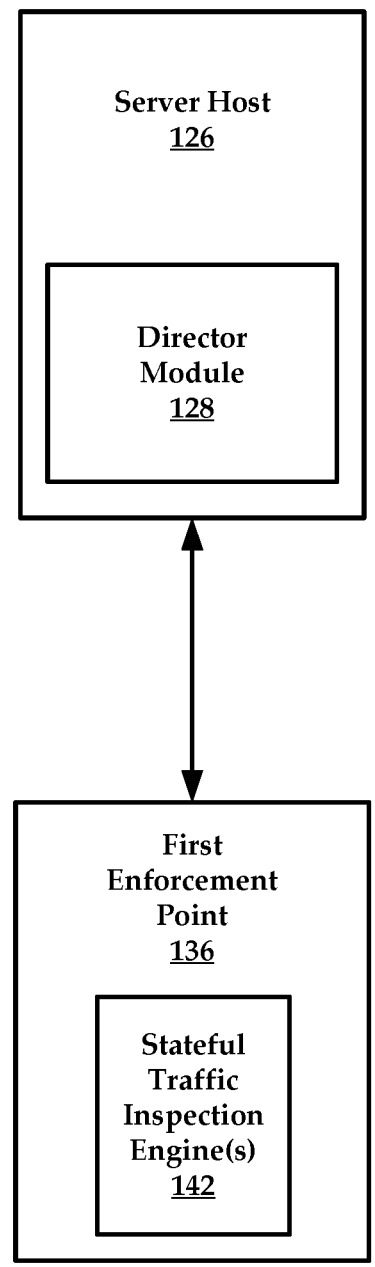
FIG. 2 is a schematic diagram of an example enforcement point and server host for use in the datacenter.

Referring now to FIG. 2, an example enforcement point is illustrated. The enforcement point includes the first enforcement point 136. The first enforcement point 136 comprises a stateful traffic inspection engine(s) 142 that can be used for traffic inspection and/or network traffic control based on security policies received from the director module 128.

Figure 3:
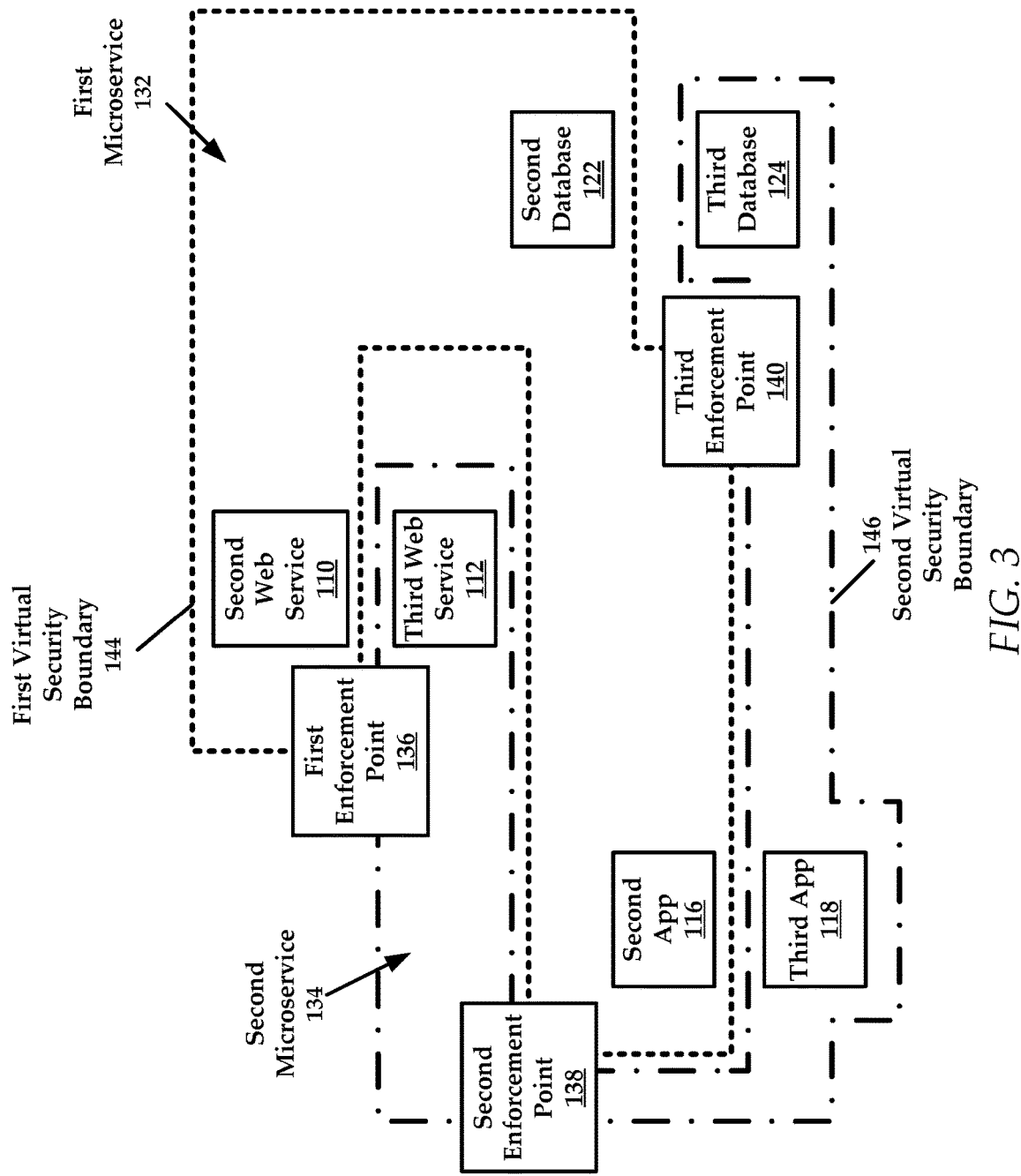
FIG. 3 is a schematic diagram that illustrates the deployment of enforcement points to create logical secure boundaries around distributed service components.

Referring now to FIG. 3, which illustrates the distributed nature of the service components of FIG. 1. Again, the service components required for a particular service may be distributed amongst many servers located proximately from one another.

The enforcement points 136-140 can create a logical or virtual security boundary around the service components for a service. In one example, the enforcement points 136-140 can create a first virtual security boundary 144 around the first service 132 (e.g., a game service), and specifically the service components of the first service 132 (the second web service 110, the second application 116, and the second database 122). In another example, the enforcement points 136-140 can create a second virtual security boundary 146 around the second service 134 (e.g., an e-commerce service), and specifically the service components of the second service 134 (the third web service 112, the third application 118, and the third database 124).

While FIG. 1 conceptually illustrates the service components for a particular service as being aligned, FIG. 3 illustrates a distributed data center where the service components for a particular service are not strictly aligned. This again is due to the service components residing on servers that are distributed throughout the data center 100. Thus, the virtual security boundary created by the enforcement points 136-140 can traverse a meandering path that encloses each of the services.

As mentioned above, a set of enforcement points such as enforcement points 136-140, can be used to create a plurality of virtual security boundaries. In other embodiments, a set of enforcement points can be deployed for each service. The use of virtual security boundaries also allows for services to be logically separated from one another for security purposes.

In FIG. 3, the first enforcement point 136 is positioned in association with service components the second web service 110 and the third web service 112. The first enforcement point 136 is positioned into the security boundaries of both the first virtual security boundary 144 and the second virtual security boundary 146. Likewise, the second and third enforcement points 138 and 140 are each positioned into the security boundaries of both the first virtual security boundary 144 and the second virtual security boundary 146.

According to some embodiments, the director module 128 is configured to manage sessions and settings of the distributed service components. For example, the director module 128 specifies what service components are required for a service, when each of the service components should be initiated and/or deactivated, and so forth. The director module 128 also determines if additional service components should be initiated during service use. For example, in a gaming service, the director module 128 may increase processing capacity for an application service component by initiating one or more additional application service component(s). The director module 128 can deploy additional enforcement points if needed to enlarge the virtual security boundary. This type of dynamic virtual security boundary management ensures that the one or more additional application service component(s) are protected through inclusion into the virtual security boundary of the gaming service. A similar but inverse process can be performed by the director module 128 when service components are deactivated.

Also, the director module 128 can track migration of the service components and re-deploy the enforcement points. For example, if the first server 102 is taken offline or is no longer functioning, the data center 100 may have backup servers that provide the same service as the first server 102. When this backup server comes online, the web service service is migrated over to the backup server and the virtual boundary is reconfigured, or the enforcement point is re-deployed. This re-deployment of the enforcement point or reconfiguration of security policy of the enforcement point causes a reconfiguration of the virtual security boundary.

In some embodiments, the director module 128 is configured to implement and distribute security policies for services. The security policy may be in accordance with a security profile for a service. The security profile can define what types of network traffic anomalies indicate possible malware issues. These traffic anomalies can involve comparisons of network traffic volume over a period of time, network traffic volume at a given period of time, network traffic volume compared to application usage, network traffic input volume versus network traffic output volume, and other similar traffic anomalies.

The director module 128 can selectively control and isolate the network traffic entering and/or exiting any of the service components of a service, due to the presence of enforcement points with each service component. For example, if the network traffic is determined to be anomalous at the second web service 110, the director module 128 can cause the first enforcement point 136 to throttle network traffic into or out of the second web service 110.

Advantageously, the director module 128 can isolate or quarantine a service component that appears to be (or actually is) infected with malware or is being subjected to malware attack by providing commands to the enforcement point associated with the service component.

Figure 4:
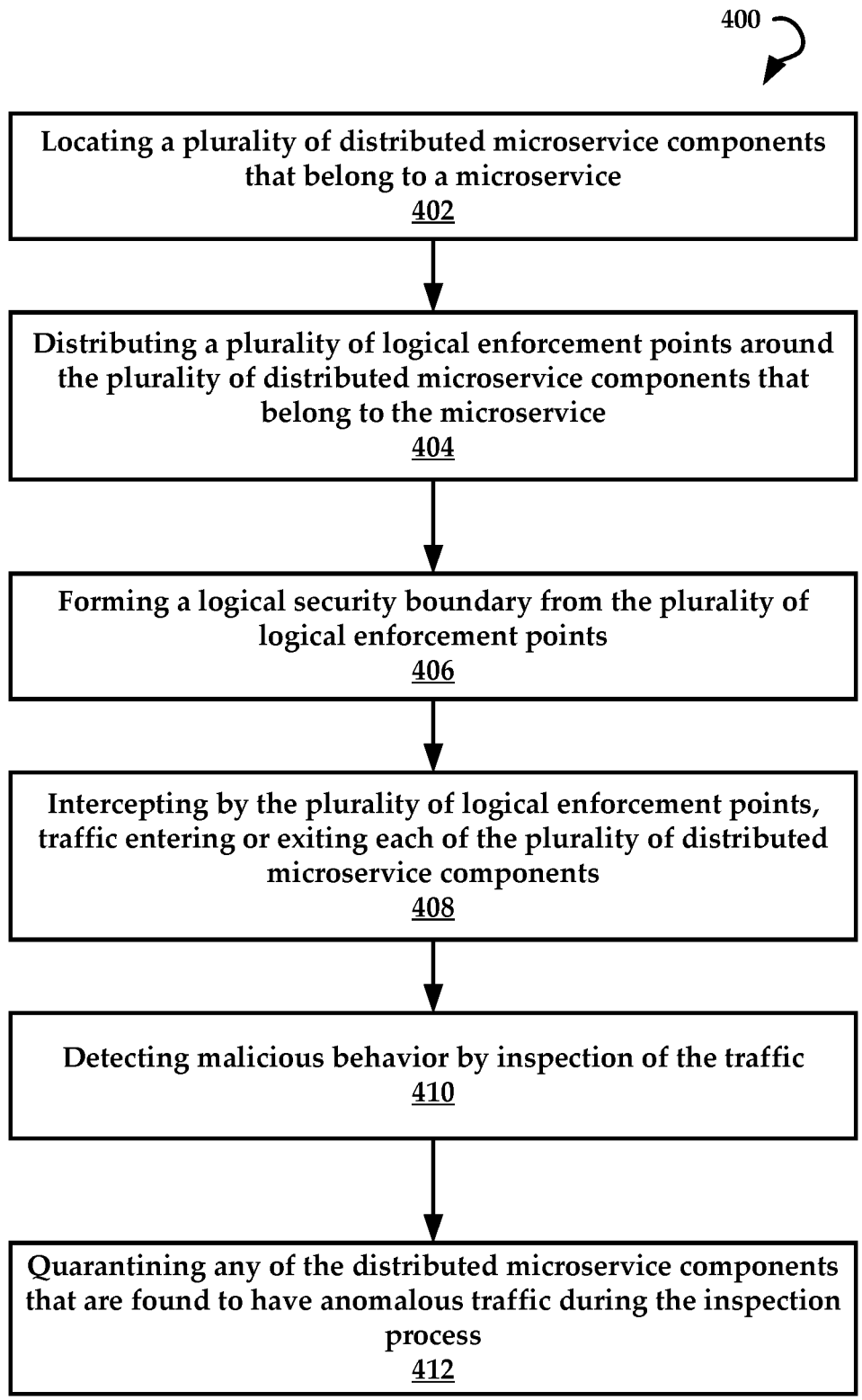
FIG. 4 is a flowchart of an example method for creating logical secure boundaries around distributed service components.

Referring now to FIG. 4, a method 400 for providing a logical security boundary for services is illustrated. In some embodiments, the method 400 comprises locating 402 a plurality of distributed service components that belong to a service. In one embodiment, at least a portion of the plurality of distributed service components are located on different physical servers in a cloud. In other embodiments, the plurality of distributed service components are collocated on the same server.

For example, the director module can be used to determine the location of each distributed service component that is used to facilitate a service, such as an e-commerce application (e.g., second service 134).

The method 400 further includes distributing 404 a plurality of logical enforcement points around the plurality of distributed service components that belong to the service. For example, the director module can spin up one or more virtual enforcement points (e.g., virtual security appliances) for each distributed service component. In some embodiments, virtual enforcement points are positioned both upstream and downstream of each distributed service component.

Next, the method 400 comprises forming 406 a logical security boundary from the plurality of logical enforcement points. That is, the virtual enforcement points are communicatively coupled to form a logical security boundary that includes the distributed service components.

In some embodiments, the method 400 comprises intercepting 408 by the plurality of logical enforcement points, traffic entering or exiting each of the plurality of distributed service components. The method 400 also includes detecting 410 malicious behavior by inspection of the traffic.

In some embodiments, the method 400 includes quarantining 412 any of the distributed service components that are found to have anomalous traffic during the inspection process.

Figure 5:
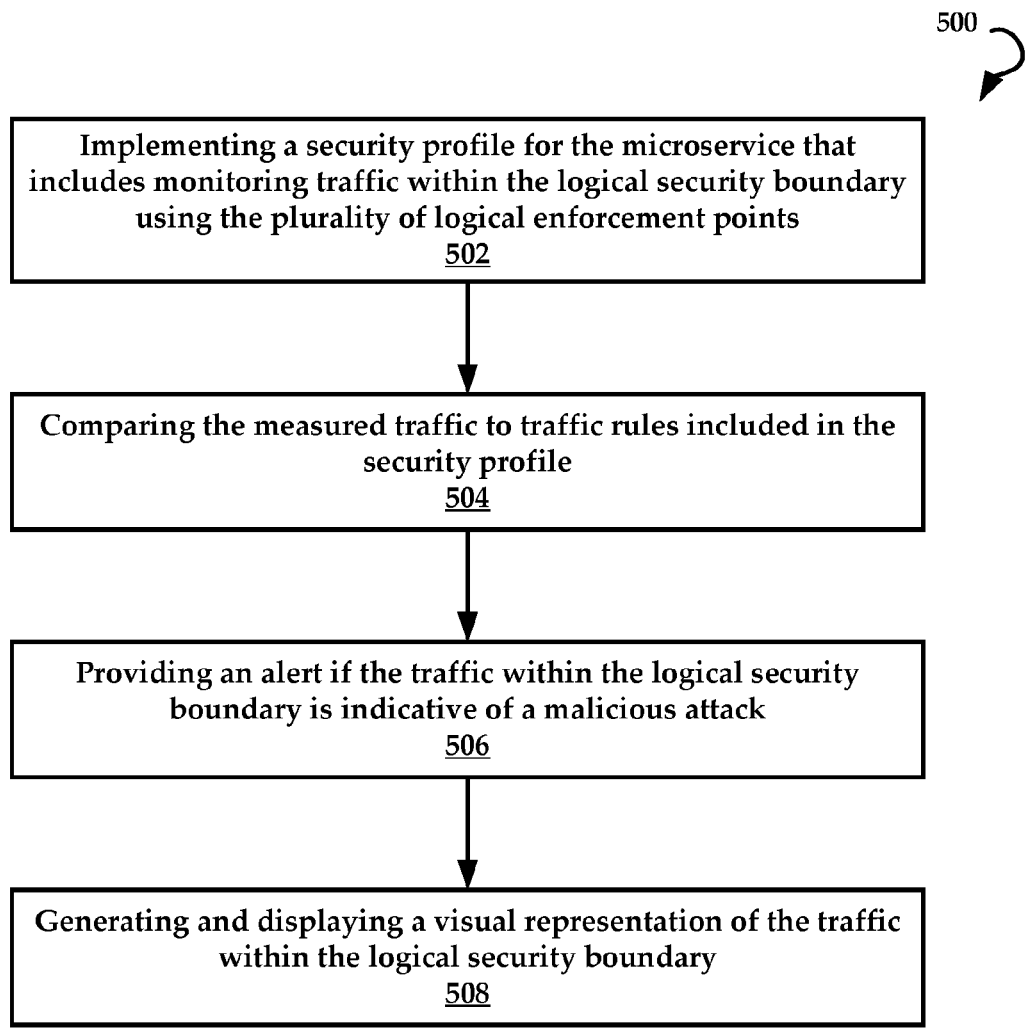
FIG. 5 is a flowchart that illustrates another example method for implementing a security policy in a distributed manner.

Referring now to FIG. 5, which illustrates another example method for implementing a security policy in a distributed manner. To be sure, the method 500 of FIG. 5 can be implemented after deployment of enforcement points throughout a service to create a logical security boundary.

In some embodiments, the method 500 includes implementing 502 a security profile for the service that includes monitoring traffic within the logical security boundary using the plurality of logical enforcement points.

Next, the method 500 includes comparing 504 the measured traffic to traffic rules included in the security profile. This comparison process can occur at the enforcement point or at the director module.

The method 500 also comprises providing 506 an alert if the traffic within the logical security boundary is indicative of a malicious attack. In some embodiments, the director module can output a message to a system administrator, such as an email or short message service (SMS) message that indicates that a violation of the security profile has occurred.

In some embodiments, the method 500 comprises generating 508 and displaying a visual representation of the traffic within the logical security boundary.

Figure 6:
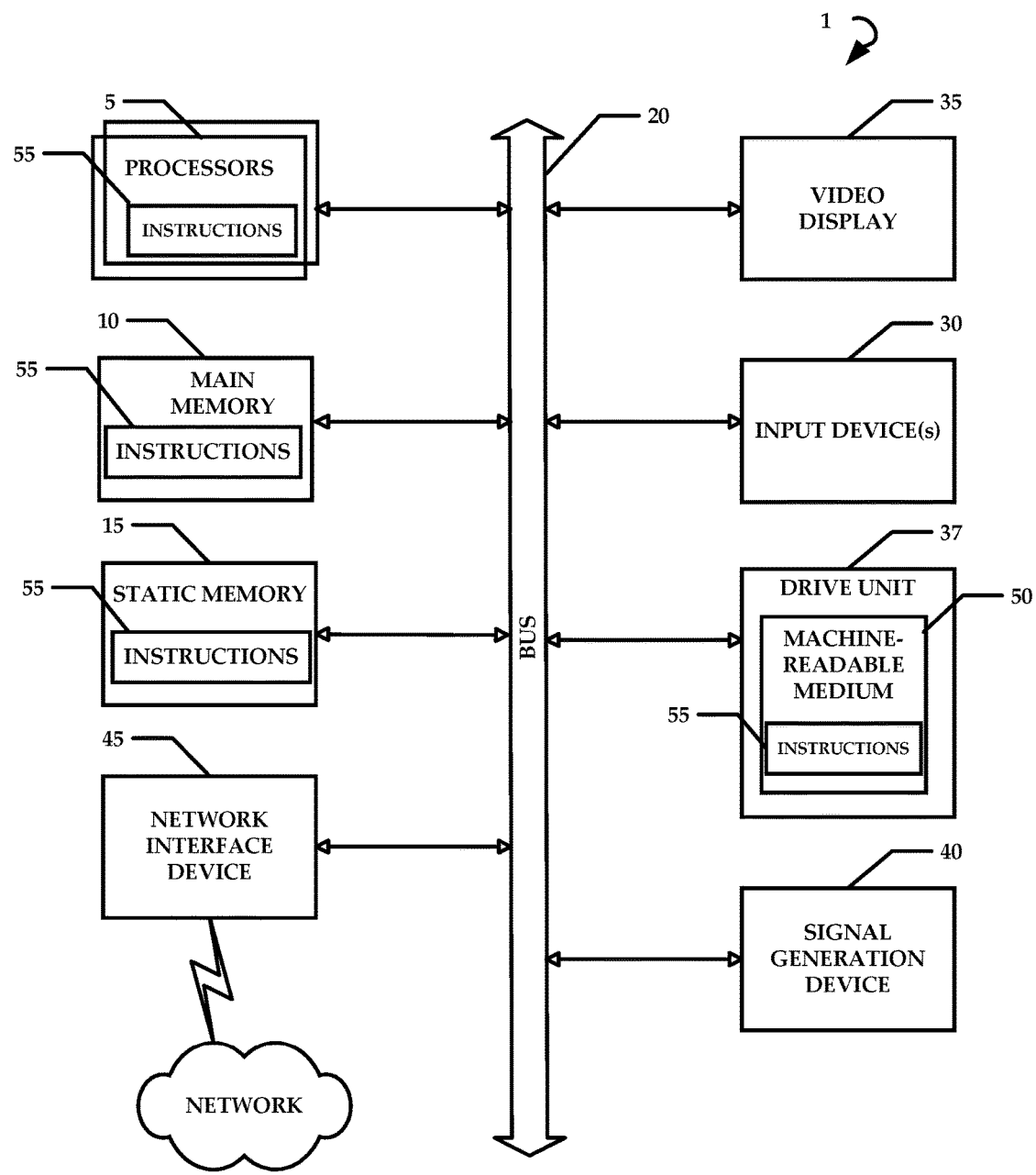
FIG. 6 is an example computing device that can be used to practice aspects of the present technology.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., alpha-numeric input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The present technology involves provisioning vulnerability scanning (or other active probing/packet insertion such as file scanning or service scanning) along with microsegmentation in a virtualized environment. Microsegmentation is to utilize distributed inline enforcement points to segment and enforce access control of traffic between virtual machines. The present technology can be used to leverage these enforcement points for scanning of the virtual machines on a local hypervisor. Advantageously, the present technology improves the performance of a cloud data center with respect to reducing the time of scanning of many devices (e.g., VMs of microsegmented environments), allowing scans to be run at any time, and allowing scanning without any impact to other workloads. These and other advantages of the present technology are described in greater detail herein.

For context, vulnerability scans are performed regularly inside data centers to locate vulnerabilities or misconfigurations of applications/services. Most of the practices are performed from a central location, sending traffic to various microsegments of data center in order to detect if there are any unknown vulnerabilities within any of the virtual machines.

However, there are several issues with current vulnerability scanning processes. For example, vulnerability scanning relies on centralized scanners to scan the entire data center, which is a time intensive process.

The vulnerability scan executes through the entire network to reach the workloads in the data center, which causes disruption of services. Thus, in most data centers, services are taken off line to be scanned due to the time intensiveness of the vulnerability scanning process.

As the vulnerability scanning may affect service availability, the vulnerability scanning can only be done during a scheduled time or overnight when the network traffic is at a minimum. The vulnerability scanning may disrupt all workloads on the networks. There is no way to perform scanning to one or a group of workloads without affecting other adjacent services when using a centrally located vulnerability scanner, because a single vulnerability scanner is scanning every VM in cloud data center. There is no way to scan the workloads (e.g., VM provisioned service or service) in a microsegmented environment since all workloads are in their own protected segment.

Stated otherwise, in order to actively probe against each virtual machine, all packets from the probing device (centrally located vulnerability scanner) must traverse the entire network. This limits the number of active probes that can occur at any given time, and can cause network disruption, so workload scanning such as penetration testing and vulnerability scanning are typically done during non-peak times. Each physical interface both on the hypervisor and the network hardware represents a potential choke-point that can cause network disruption and limits the amount of scanning that can occur in parallel. As a result, scanning is often performed in a serialized manner (e.g., hypervisor by hypervisor, with only one hypervisor being scanned at a time). The scanning of a large cloud data center can take days or weeks to perform.

In a microsegmented environment where there is security (e.g., an enforcement point) in front of each VM, scanning can only occur if a security policy has been configured to allow the scanning procedure, making a less secure environment. For example, the vulnerability scan must breach or pass through the network firewall because the VMs require coupling to the centrally located vulnerability scanner in order to complete the vulnerability scanning process.

Additionally, a security device may block some or all of the scanning, giving a false result, which is a security concern.

With the above context in place, the present technology enables vulnerability scanning directly within the microsegmented environments, overcoming the aforementioned deficiencies of a centrally located vulnerability scanner. Microsegmentation deploys an inline enforcement point next to the workloads, on every hypervisor, to monitor or enforce traffic between workloads. The enforcement point can be a virtual machine, a physical server, a kernel module, a process, a container, or an agent inside a server. The workloads can be virtual machines, containers, or physical servers.

In some embodiments, each enforcement point implements an active probe device that performs vulnerability scanning from the enforcement points to the local workloads whenever needed. As the enforcement point is only one hop to the local workloads (e.g., VMs in some embodiments), the enforcement points can scan single or multiple target workloads without any side effects on the neighboring workloads.

Figure 7:
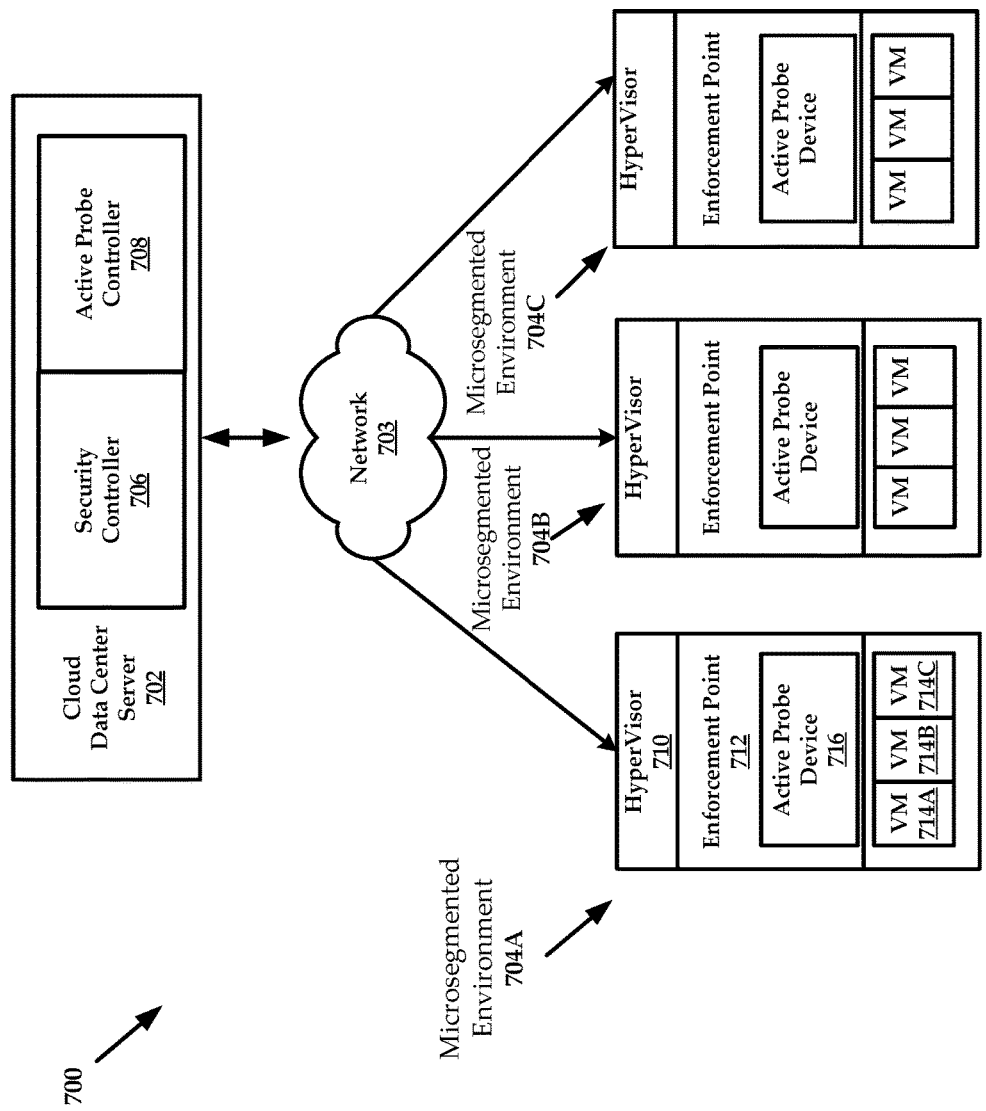
FIG. 7 is another example architecture of a system that implements scanning within microsegmented environments.

Referring now to FIG. 7, a system 700 is illustrated that comprises a cloud data center server 702 and a plurality of microsegmented environments 704A-C. The cloud data center server 702 and plurality of microsegmented environments 704A-C are communicatively coupled to one another over a network 703. In some embodiments, the system 700 is a cloud data center.

It is noteworthy to mention that the plurality of microsegmented environments 704A-C can communicate with a security controller 706 and an active probe controller 708 in a unidirectional manner, meaning that the security controller 706 and the active probe controller 708 can transmit messages to the plurality of microsegmented environments 704A-C such as security policies and vulnerability scanning requests. The plurality of microsegmented environments 704A-C need not transmit data back to the security controller 706 or the active probe controller 708, in some embodiments. This is in contrast with system that implements a centrally located vulnerability scanner where the microsegmented environments depend on the centrally located vulnerability scanner to perform the vulnerability scanning process. When the microsegmented environments 704A-C are adapted to perform vulnerability scanning internally, the plurality of microsegmented environments 704A-C can communicate with the security controller 706 and/or the active probe controller 708 to report a scan status or a security policy violation. Nevertheless, the microsegmented environments 704A-C do not depend on the security controller 706 or the active probe controller 708 to perform a scan. In some embodiments, security controller 706 and the active probe controller 708 may be the same device.

In one embodiment, the cloud data center server 702 comprises the security controller 706 and the active probe controller 708. The cloud data center server 702 can include additional components of a computer system described in greater detail with reference to FIG. 6.

The security controller 706 is configured, in some embodiments to push security policies that are implemented at the hypervisor level or enforcement point level. Examples of security policies include, but are not limited to firewall policies, virus scanning, and well as other security policies that would be known to one of ordinary skill in the art. To be sure, the security controller 706 does not act as a centralized vulnerability scanner because any vulnerability scanning processes occur directly within the microsegmented environments. The security controller 706 can also monitor the microsegmented environments for violation of security policies.

The active probe controller 708 can be utilized to control individual active probe devices executing within the microsegmented environments. The active probe controller 708 can implement execution of scanning schedules or cause vulnerability scanning to occur when potential malicious or suspicious activity, or network traffic, is detected for any workload. For example, the active probe controller 708 can request that an active probe device execute a scan when the security controller 706 detects the violation of a security policy such as the detection of increased network traffic, communication with known malicious resources, or anomalous workload behaviors—just to name a few. To be sure, the active probe controller 708 does not conduct any vulnerability scanning of the microsegmented environments. Again, this scanning occurs entirely within the microsegmented environments.

Additional descriptions of the microsegmented environments are provided below. For brevity and clarity, only one of the microsegmented environments 704A-C, such as microsegmented environment 704A is described in greater detail. Thus, each of the microsegmented environments 704B-C can be implemented in a manner similar to microsegmented environment 704A. To be sure, the system 700 can implement any number of microsegmented environments.

The microsegmented environment 704A comprises a hypervisor 710, an enforcement point 712, an active probe device 716, and a plurality of VMs 714A-C (broadly defined as "workloads" or "services" herein).

The hypervisor 710 controls and manages the plurality of virtual machines 714A-C, allowing them to create and provide services to end users.

As mentioned above, the enforcement point 712 can be a virtual machine, a physical server, a kernel module, a process, a container, or an agent inside a server. The plurality of virtual machines 714A-C can also include containers or physical servers that are configured to provide services or workloads.

Enforcement points are deployed on hypervisors and managed by a director such as the cloud data center server 702. According to some embodiments, the enforcement point 712 comprises an active probe device 716. In general, an active probe device is a component that generates packets to test/check devices that are on the network. Examples of an active probe device include, but are not limited to, a vulnerability scanner, a file scanner, a service scanner, a penetration tester, a host scanning tool, or any other device used for active monitoring or scanning purposes. In various embodiments, the active probe device includes any type of scanning tool that requires an active probe that would otherwise be blocked.

In some embodiments, the enforcement point 712 is configured to control the active probe device 716 to execute a vulnerability scan of the plurality of virtual machines 714A-C. In some instances the enforcement point 712 is pre-programmed to cause the active probe device 716 to execute a vulnerability scan according to a schedule. For example, the active probe device 716 will execute a vulnerability scan every hour, day, week, or other time. Advantageously, since the active probe devices are each only required to scan the workloads of one microsegmented environment, the time required to scan the entire system 700 is equal to a time required to scan the largest microsegmented environment.

When a vulnerability scan is required for the entire workload (e.g., all VMs in a microsegmented environment), commands are distributed to all enforcement points using the active probe controller 708.

In some embodiments, vulnerability scanning tools are pre-provisioned on the enforcement point within the active probe device 716, the enforcement point 712 can start scanning the targeted workloads. If the vulnerability scanning tools are not pre-provisioned on the enforcement point, the enforcement point 712 can obtain the vulnerability scanning tools from the active probe controller 708, for example. Again, the duration of the scanning of entire data center will be the longest time taken to scan the largest single hypervisor. This is highly advantageous compared to systems that implement vulnerability scanning tools outside of the microsegmented environment, such as where a vulnerability scanner services many hypervisors in the data center.

In more detail, a vulnerability scan is desired for a logical group of workloads spread among multiple hypervisors or locations. The active probe controller 708 can initiate scanning by sending commands to enforcement points protecting the targeted workloads. Only the enforcement points protecting targeted workloads will engage the scanning to those local targeted workloads.

While the present technology describes the implementation of vulnerability scanning at the enforcement point level, the same mechanism can expand to any activities with active network probing or packet insertion/modification of network traffic. Other examples can be an active performance measurement probe that an enforcement point sends to the cloud data center server 702 to simulate client packets and thereby measure the performance and latency of cloud data center server 702 responses without creating network overhead. Other examples include HTTP header modification to insert banners or customized texts. Distributed enforcement points can perform these tasks in a more scalable way.

Again, advantages are provided when active probes are located on the security device itself (enforcement point) that is providing the microsegmentation. Network probes become distributed, with a lightweight probe sitting on each element of the distributed security device. Additionally, there is no congestion caused on the network 703. Probing does not traverse any security devices, such as firewalls, removing all security strain due to policy lookups.

Probing is controlled from the active probe controller 708, allowing for scanning to become policy driven or triggered. In an additional advantage, security becomes more secure as changes to a security policy (such as a firewall policy) to allow for scanning, are not required, and scanning can occur directly within a VM.

Probing/scanning can occur on each hypervisor in parallel. Scan type probing (vulnerability scanning for example) on the entire environment will take only as long as it takes to scan the largest hypervisor within the data center. Also, scanning can be executed on-demand or triggered at any time without affecting other adjacent workloads. For example, microsegmented environment 704A can be scanned without affecting the performance of microsegmented environment 704B or microsegmented environment 704C.

In yet another advantage, the distributed nature of implementing scanning within the microsegmented environments themselves allows for real-time scanning of the entire data center, even during peak data center hours. This is because the vulnerability scanning occurs at the microsegmented environment level, rather than requiring communication over the network with a centrally located vulnerability. Thus, the distributed nature of the vulnerability scanning of the system 700 causes no deleterious effect whatsoever on network performance, such as latency of the network 703.

In some embodiments, the active probe controller 708 is configured to implement a remediation scheme when a vulnerability scan indicates that a workload/VM is experiencing vulnerability.

In one example, a remediation scheme comprises the enforcement point 712 isolating its microsegmented environment 704A from communicating with other microsegmented environments (e.g. microsegmented environments 704B/704C) or communicating over the network 703.

In another example, a remediation scheme comprises the security controller 706 implementing a heightened security policy for the microsegmented environment 704A. In yet another example, the remediation scheme comprises the enforcement point 712 or the active probe controller 708 identifying a microsegmented environment for further evaluation by a security administrator.

FIG. 8 is a flowchart of an example method 800 for providing vulnerability scanning within a microsegmented data center.

The method 800 includes a step of establishing 802 a plurality of microsegmented environments within a cloud data center. As mentioned above, each of the plurality of microsegmented environments comprises a hypervisor that controls a plurality of virtual machines. Further, each of the hypervisors comprises at least one active probe device that implements vulnerability scanning, for example.

Next, the method 800 includes provisioning 804 each of the plurality of microsegmented environments with a security policy that is implemented by the hypervisor. Again, this security policy can include a firewall policy for the microsegmented environment.

In some embodiments, the method 800 includes executing 806 a vulnerability scan on each of the plurality of microsegmented environments by way of their respective active probe devices. In some embodiments, the scan occurs simultaneous on the plurality of microsegmented environments (e.g., in parallel).

As mentioned above, the step of executing a vulnerability scan can occur at the behest of the enforcement point if the enforcement point is pre-provisioned with a scanning schedule. Alternatively, the step of executing a vulnerability scan can occur when the active probe controller causes the enforcement points (ultimately the active probe devices) to conduct a vulnerability scan.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system comprising:
   a plurality of segmented environments, each of the plurality of segmented environments comprising an enforcement point comprising an active probe device, and a plurality of workloads each implementing at least one service component, the plurality of segmented environments collectively providing a service, each of the plurality of segmented environments providing a portion of the service; and
   a data center server coupled with the plurality of segmented environments over a network, the data center server comprising:
   a security controller providing, via at least one processor, a security policy to each of the plurality of segmented environments, the security policy being configured using the service; and
   an active probe controller requesting, via the at least one processor, each active probe device of the plurality of segmented environments to perform a respective scan of a plurality of scans, the plurality of scans performed on the plurality of segmented environments collectively providing the service, the plurality of scans occurring in parallel on the plurality of workloads implementing the at least one service component, the plurality of scans being executed synchronously on the plurality of segmented environments without affecting performance of the network established between the data center server and the plurality of segmented environments, the active probe device of one or more of the plurality of segmented environments implementing a remediation scheme when the plurality of scans indicate a vulnerability.

2. The system according to claim 1, wherein each respective scan occurs independent of the data center server.

3. The system according to claim 2, wherein each of the plurality of segmented environments comprises a firewall, each respective scan occurring without traversing the network or passing through the firewall.

4. The system according to claim 2, wherein, in response to completion of the respective scan, each of the plurality of segmented environments reports a scan status to the data center server via the network.

5. The system according to claim 1, wherein the active probe device of each of the plurality of segmented environments is configured to execute the respective scan on demand.

6. The system according to claim 1, wherein the active probe controller is configured to cause the active probe device of one or more segmented environments of the plurality of segmented environments to execute the respective scan when a triggering event is detected by the security controller.

7. The system according to claim 1, wherein the active probe device of each of the plurality of segmented environments is configured to execute the respective scan upon detection of a violation of the security policy.

8. The system according to claim 7, wherein the violation of the security policy includes anomalous workload behaviors.

9. The system according to claim 1, wherein the active probe device of each of the plurality of segmented environments uses one or more scanning tools to perform the respective scan, the active probe device of each of the plurality of segmented environments obtaining the one or more scanning tools from the active probe controller if the one or more scanning tools are not pre-provisioned on the enforcement point.

10. A method comprising:
establishing a plurality of segmented environments within a data center, each of the plurality of segmented environments comprising an enforcement point comprising an active probe device, and a plurality of workloads each implementing at least one service component, the plurality of segmented environments collectively providing a service, each of the plurality of segmented environments providing a portion of the service;
provisioning each of the plurality of segmented environments with a security policy, the security policy being configured using the service; and
performing a scan on each of the plurality of segmented environments using a respective active probe device, the scans performed on the plurality of segmented environments collectively providing the service, the scans occurring in parallel on the plurality of workloads implementing the at least one service component, the respective active probe device identifying an affected segmented environment, the scans being executed synchronously on the plurality of segmented environments without affecting performance of a network established between a data center and the plurality of segmented environments, the respective active probe device implementing a remediation scheme when the scans indicate a vulnerability.

11. The method according to claim 10, wherein the network couples the plurality of segmented environments and the data center, wherein the performance of the scan occurs in its entirety without crossing the network.

12. The method according to claim 11, further comprising reporting, in response to completion of the scan, a scan status to the data center via the network.

13. The method according to claim 10, further comprising transmitting to the respective active probe device instructions to execute the scan.

14. The method according to claim 10, wherein the respective active probe device of each of the plurality of segmented environments is configured to execute the scan on demand.

15. The method according to claim 10, further comprising detecting a triggering event within one or more segmented environments of the plurality of segmented environments, wherein the respective active probe device of the one or more segmented environments is configured to execute the scan in response to the triggering event being detected.

16. The method according to claim 10, further comprising detecting a violation of the security policy within one or more segmented environments of the plurality of segmented environments, wherein the respective active probe device of the one or more segmented environments is configured to execute the scan in response to the violation being detected.

17. The method according to claim 16, wherein the violation of the security policy includes anomalous workload behaviors.

18. The method according to claim 10, further comprising obtaining one or more scanning tools from the data center if the one or more scanning tools are not pre-provisioned on the respective active probe device, wherein the respective active probe device uses the one or more scanning tools to perform the scan.

19. A method comprising:
establishing a plurality of segmented environments coupled to a data center server over a network, each of the plurality of segmented environments comprising an enforcement point comprising an active probe device, and a plurality of workloads each implementing at least one service component, the plurality of segmented environments collectively providing a service, each of the plurality of segmented environments providing a portion of the service;
providing, using a security controller, a security policy to each of the plurality of segmented environments, the security policy being configured using the service; and
requesting each active probe device of the plurality of segmented environments to perform a respective scan of a plurality of scans, the plurality of scans performed within the plurality of segmented environments collectively providing the service, the respective scan occurring independently of the data center server and other segmented environments of the plurality of segmented environments, the plurality of scans occurring in parallel on the plurality of workloads implementing the at least one service component, the plurality of scans being executed synchronously within the plurality of segmented environments without affecting performance of the network established between the data center server and the plurality of segmented environments, the active probe device of one or more of the plurality of segmented environments implementing a remediation scheme when the plurality of scans indicate a vulnerability.

* * * * *